United States Patent [19]
Hidetsugu et al.

[11] Patent Number: 5,464,263
[45] Date of Patent: Nov. 7, 1995

[54] VACUUM ADSORBER

[75] Inventors: Nishiguchi Hidetsugu, 22-28, Kawasaki 2-chome, Ise-shi, Mie; Nishiguchi Kenji, Mie, both of Japan

[73] Assignee: Nishiguchi Hidetsugu, Mie, Japan

[21] Appl. No.: 331,092

[22] Filed: Oct. 28, 1994

[30] Foreign Application Priority Data

Aug. 17, 1994 [JP] Japan ..................... 6-193447

[51] Int. Cl.$^6$ ........................... B25J 15/06; B66C 1/02
[52] U.S. Cl. ............................................. 294/64.1
[58] Field of Search .................. 294/64.1, 65; 248/362, 248/363; 269/21; 271/90, 91, 94, 102; 414/627, 737, 752, 793, 797; 901/40

[56] References Cited

U.S. PATENT DOCUMENTS

| | | | |
|---|---|---|---|
| 3,202,420 | 8/1965 | Dovey | 294/64.1 X |
| 3,377,096 | 4/1968 | Wood | 294/64.1 |
| 3,598,439 | 8/1971 | Dahlquist et al. | 294/65 |
| 3,720,433 | 3/1973 | Rosfelder | 294/64.1 |
| 3,865,359 | 2/1975 | Caroli | 294/65 X |
| 4,088,312 | 5/1997 | Frosch et al. | 294/65 X |
| 4,221,356 | 9/1980 | Fortune | 294/64.1 X |
| 4,763,941 | 8/1988 | Sniderman | 294/64.1 |

Primary Examiner—Johnny D. Cherry
Attorney, Agent, or Firm—Kanesaka & Takeuchi

[57] ABSTRACT

A vacuum adsorber includes a base (4); an adsorption member (3) attached to the base and made from an elastic material so as to have a vacuum cavity (2) with an opening (3a) on a side opposite to the base; a slider (5) having a friction face (7) and a periphery sliding along a side wall of the vacuum cavity; a spring member (15) provided within the vacuum cavity for biasing the slider toward the opening; a vacuum tube (6) for connecting the vacuum cavity to a vacuum source; and a through-hole (8) provided on the friction face for allowing fluids to enter the vacuum cavity.

2 Claims, 8 Drawing Sheets

VACUUM ADSORBER

BACKGROUND OF THE INVENTION

1. Field of the Invention

The present invention relates to vacuum adsorbers which are able to adsorb objects with uneven surfaces without slipping.

2. Description of the Related Art

Conventional vacuum adsorbers include an adsorption member made from an elastic material, such as rubber, so as to have a vacuum cavity in which a vacuum is generated to thereby adsorb an object.

However, there are many cases of slipping between the conventional vacuum adsorber and the object adsorbed. If the object to be adsorbed has a very low friction resistance, such as glass, it falls by gravity when the vacuum adsorber is tilted to a large angle. Even where the object has a relatively large friction resistance, if it is wet, the same problem occurs.

Where the object has a dent, there is a gap between the vacuum adsorber and the object drawing air therethrough so that the adsorber fails to adsorb the object. If the vacuum is made very large in order to increase the adsorption power, the elastic adsorption member can be sucked into the vacuum cavity, failing to work.

SUMMARY OF THE INVENTION

Accordingly, it is an object of the invention to provide a vacuum adsorber which is free from the above problems.

According to an aspect of the invention there is provided a vacuum adsorber which includes a base; an adsorption member attached to the base and made from an elastic material so as to have a vacuum cavity with an opening on a side opposite to the base; a slider having a friction face and a periphery sliding along a side wall of the vacuum cavity; a spring member provided within the vacuum cavity for biasing the slider toward the opening; a vacuum tube for connecting the vacuum cavity to a vacuum source; and a through-hole provided on the friction face for allowing fluids to enter the vacuum cavity.

According to another aspect of the invention, in the above vacuum adsorber, the friction face has a groove extending outwardly from the through-hole.

When vacuums are produced in the vacuum cavities after the friction faces abut the object, the cavity walls of the elastic adsorption member experience the pulling into the vacuum cavities. However, the side walls of the sliders prevent the cavity walls from being bent toward the interior while air is sucked into the vacuum cavities through the through holes on the friction faces to thereby adsorb the object bringing the friction faces into close contact with the object surface. Since the adsorption member is elastic, it is able to change its surface according to the surface condition of the object. The friction face is brought into contact with the object so closely that no or little slipping takes place. As the vacuum increases, the slider is moved toward the base against the spring member so that the adsorption member is contracted without bending into the inside. The larger the vacuum, the larger the replacement of the slider and the contraction of the adsorption member, and so are the adsorbing power and the friction resistance.

In order to remove the vacuum adsorber from the object, it is only necessary to release the vacuum. The pressure of the cavities becomes equal to that of the atmosphere so that the object is released from the vacuum adsorber. The elastic adsorption member returns to its original condition while the sliders are moved back to the openings of the vacuum cavities in preparing for the next operation.

The grooves on the friction face facilitate even sucking over the entire friction face thereby increasing the adsorbing power and the friction resistance.

It is possible to use the vacuum adsorber in a different atmosphere such as air or water.

The above and other objects, features, and advantages of the invention will be more apparent from the following description when taken in conjunction with the accompanying drawings.

DESCRIPTION OF THE PREFERRED EMBODIMENT

Figure 1:
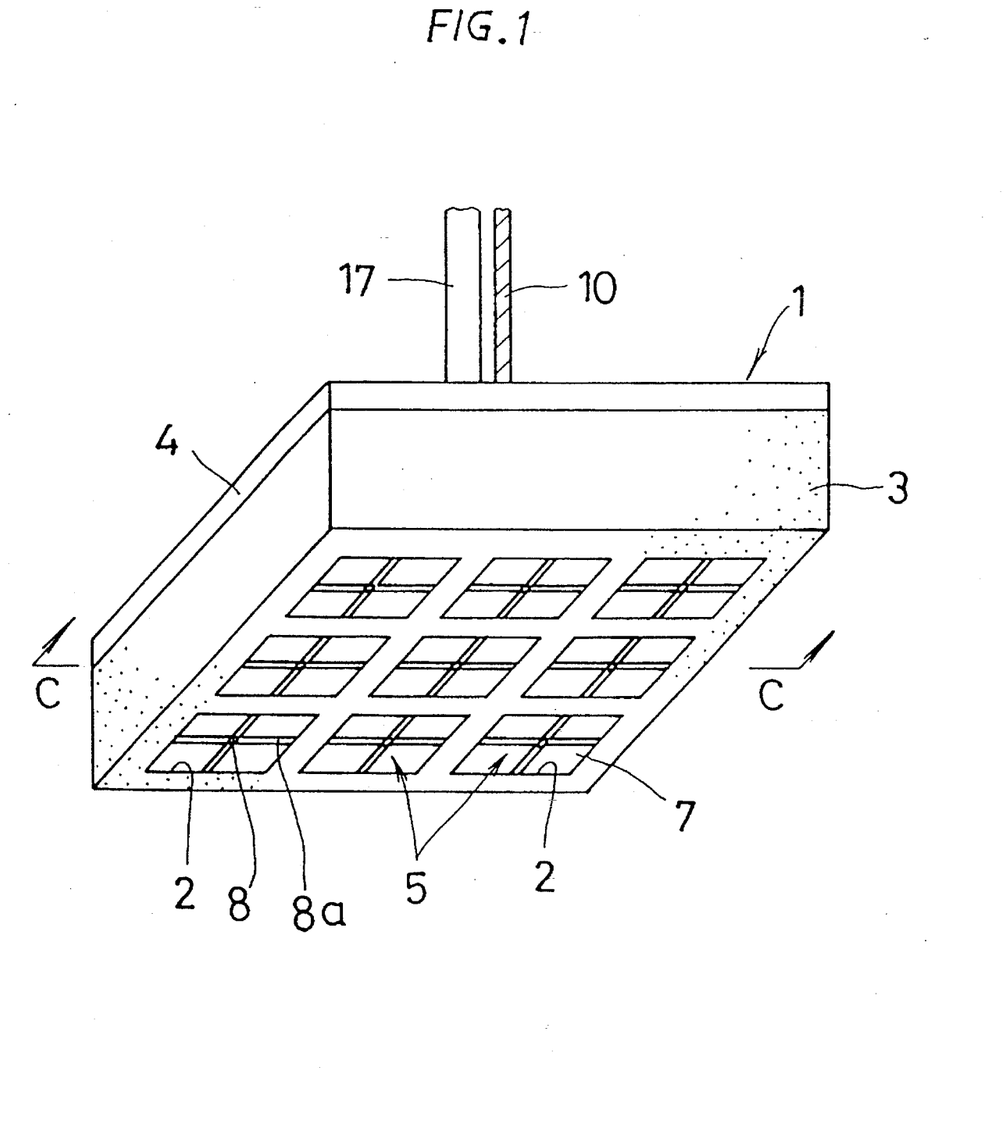
FIG. 1 is a perspective view of a vacuum adsorber according to an embodiment of the invention.
Figure 2:
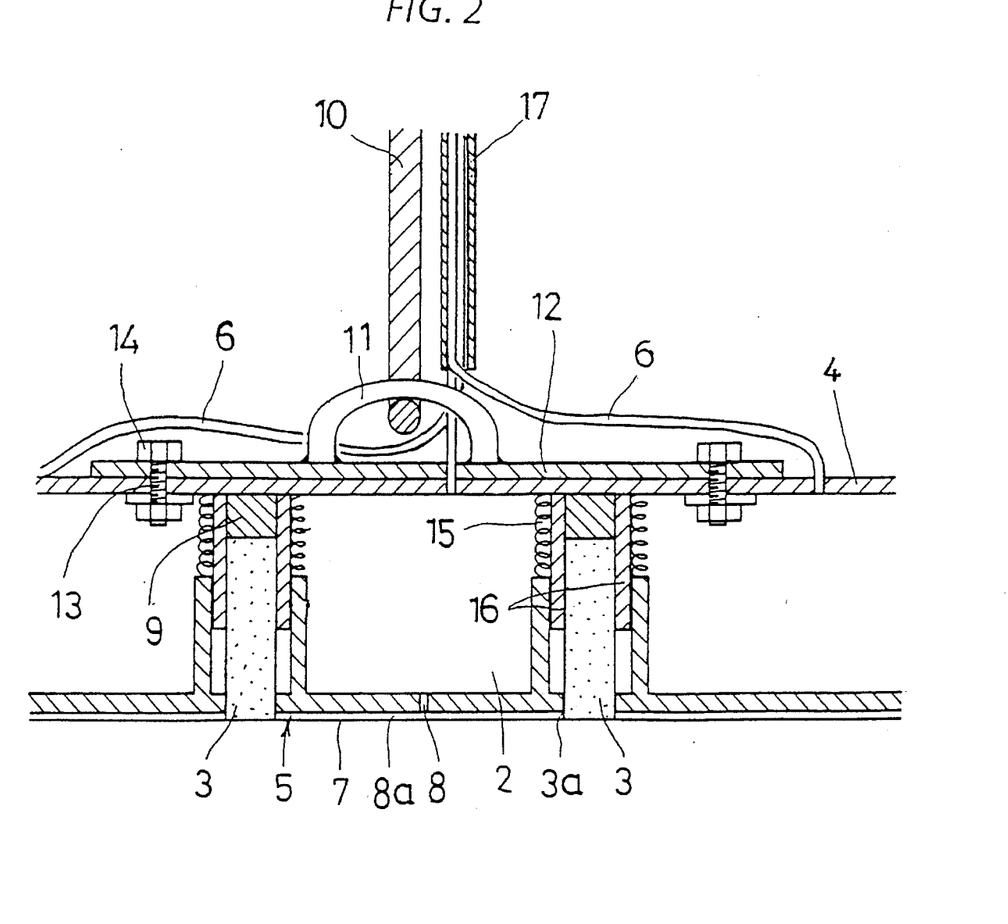
FIG. 2 is a sectional view taken along line C—C of FIG. 1.

In FIGS. 1 and 2, a negative pressure or vacuum adsorber 1 includes a adsorption member 3 made of an elastic material so as to define cavities 2; a base 4 attached to a top face of the adsorption member 3; sliders 5 movable in the cavities 2 and having a friction face 7 on the side of a cavity opening 3a; tubes 6 connecting the cavities 2 to a negative pressure or vacuum source; and through-holes 8 provided in the friction face 7 for sucking a fluid by a negative pressure or vacuum produced by the vacuum source.

The adsorption member 3 is made from an elastic material, such as rubber or sponge, in a predetermined shape, such as a rectangular parallelepiped, cube, or cylinder, so as to provide the cavities 2 which extend across the top and bottom faces. The stiffness of materials for the adsorption member 3 is selected according to the use. Soft materials tend to fill a dent of the surface of an object A (FIG. 3) thereby preventing leaks. The number of cavities 2, which is nine in the illustrated device, may vary with the use. Where a plurality of cavities are used, if one or more cavities 2 fail to adsorb an object A because of the rough surface of the object, for example, the rest of the cavities 2 will still be able to adsorb the object. The section of cavities 2, which is square in the illustrated embodiment, may be one of other polygons, such as diamond, or circle, or oval.

The adsorption member 3 is attached to the base 4 via pedestals 9. A fixing plate 12 with a handle 11 for tying a rope 10 is attached to the top of the base 4 with bolts 13 and nuts 14. The pedestals 9 reinforce the attachment, but the adsorption member 3 may be attached to the base directly without the pedestals 9.

Figure 9:
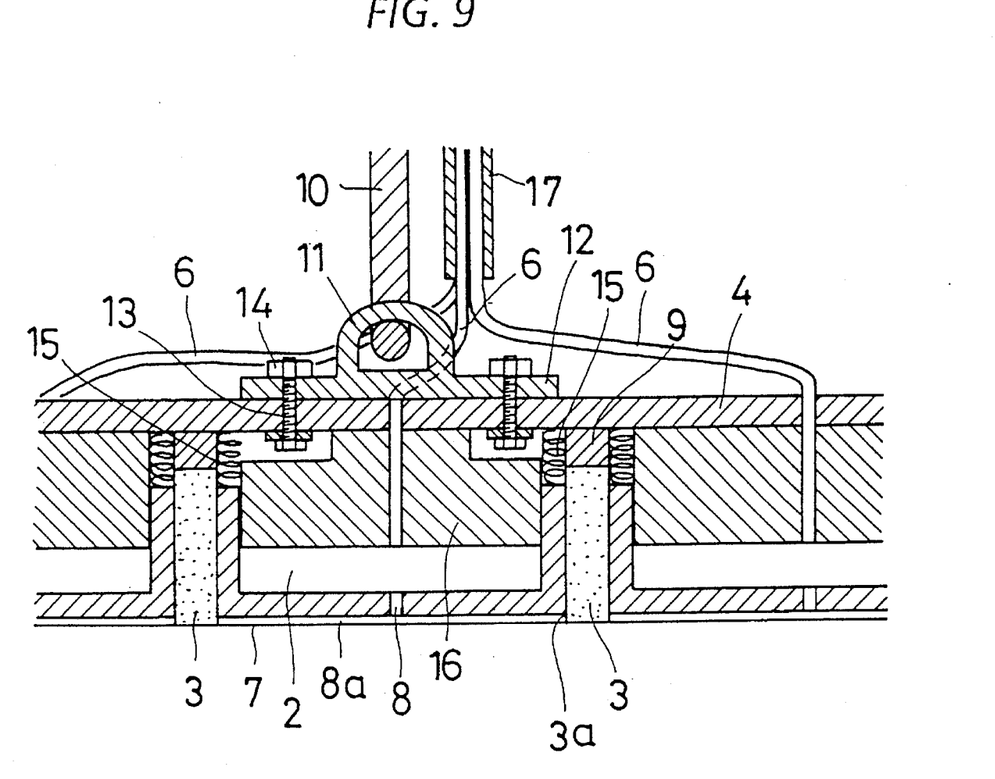
FIG. 9 is a sectional view of a vacuum adsorber according to another embodiment of the invention.

Each slider 5 movable in one of the cavities 2 in directions perpendicular to the base 4 is biased toward the opening 3a by spring members 15. The slider 5 has a friction face 7 on the side of the opening 3a for abutting on the object A to be adsorbed and side walls sliding on guide members 16 with a play such that the friction face 7 is able to tilt according to the surface of an object A. The spring members 15 are adjusted such that when no adsorption is made, the friction face 7 is flush with the opening 3a. The guide members 16 provided to reduce the friction resistance between the adsorption member 3 and the slider 5 may be placed within the slider 5 so that the side walls of the slider 5 are brought into direct contact with the adsorption member 3 as shown in FIG. 9.

Each cavity 2 is connected to a vacuum source via one of the vacuum tubes 6 which are bundled in a tube cover 17. The tube cover 17 is suspended along the rope 10 but may be mounted on the base 4. Since each cavity 2 is connected to the vacuum source independently, if one or more cavities 2 cause leaks because of damage or the surface condition of the object A, the other cavities 2 are able to keep the suction forces. Alternatively, a safety valve may be attached to each vacuum tube 6. The diameter of the vacuum tubes 6 may be made small so as to reduce the suction power thereby assuring the safety.

When vacuums are produced in the cavities 2 via the vacuum tubes 6, fluids are sucked into the cavities 2 through the through-holes 8 on the friction faces 7. Consequently, the friction faces 7 frictionally abut a surface of the object A. As best shown in FIG. 1, a single through-hole 8 is formed at the center of a friction face 7, and grooves 8a extend therefrom in a crisscross fashion so that the fluid is sucked evenly. Alternatively, a different number of through-holes and a different pattern of grooves may employed. Examples of the preferred slider and friction material include woods, hard rubbers, synthetic resins, and light metals. The grooves 8a also increase the slipping prevention capability.

Figure 3:
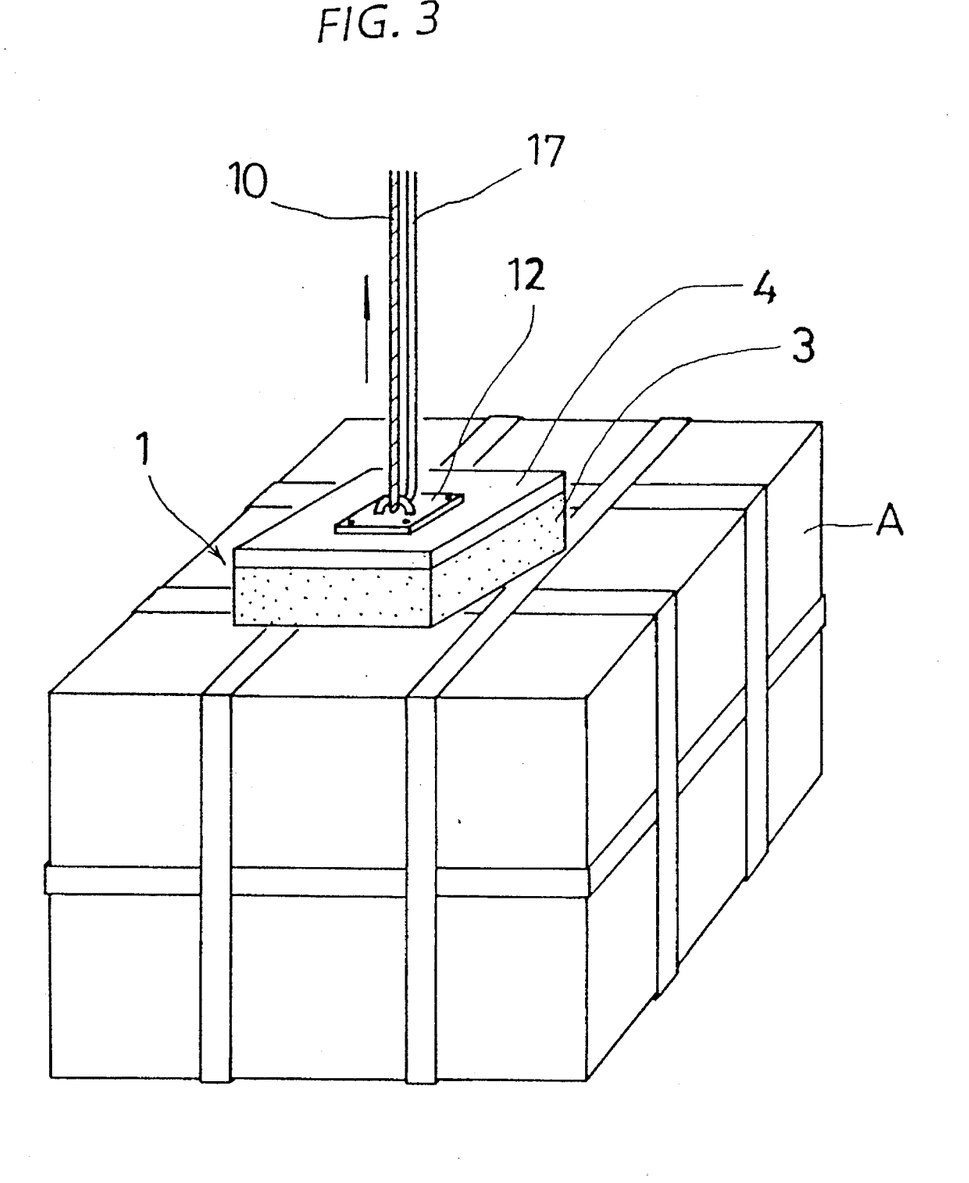
FIG. 3 is a perspective view of the vacuum adsorber which is adsorbing an object.
Figure 4:
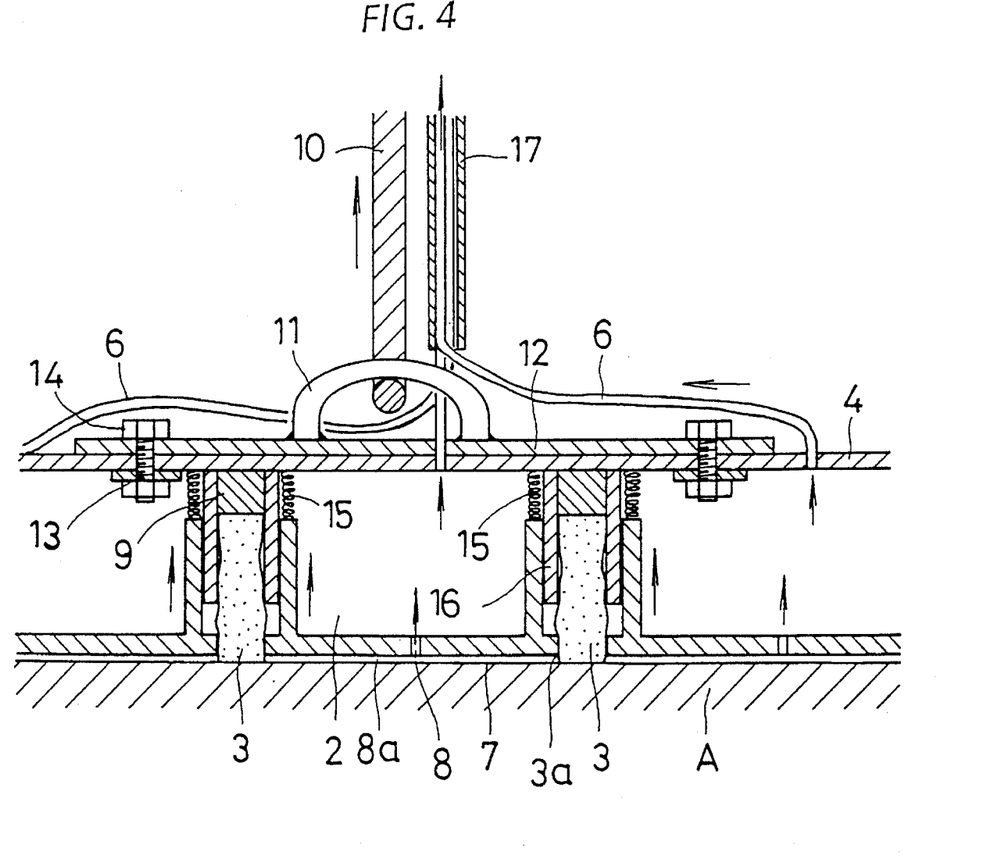
FIG. 4 is a sectional view of the vacuum adsorber under the adsorbing condition.

In operation, FIGS. 1—4 show how the vacuum adsorber 1 lifts an object A. The vacuum adsorber 1 is connected to a crane (not shown) via the rope 10 and to a vacuum source (not shown) via the tube bundle 17. As best shown in FIG. 3, the vacuum adsorber 1 is brought into contact with the object A, and vacuums are produced in the cavities 2. As best shown in FIG. 4, fluids are sucked through the through-holes 8, cavities 2, and vacuum tubes 6. Consequently, the adsorption member 3 is contracted toward the base 4 by the vacuums so that the sliders 5 are moved toward the base 4 against the spring members 15, with the friction faces 7 abutted on the object A. The adsorption member 3 abuts the side walls of the sliders 5 so that no edges are sucked into the cavities 2 while the surface is kept in close contact with the surface of the object A.

Figure 5:
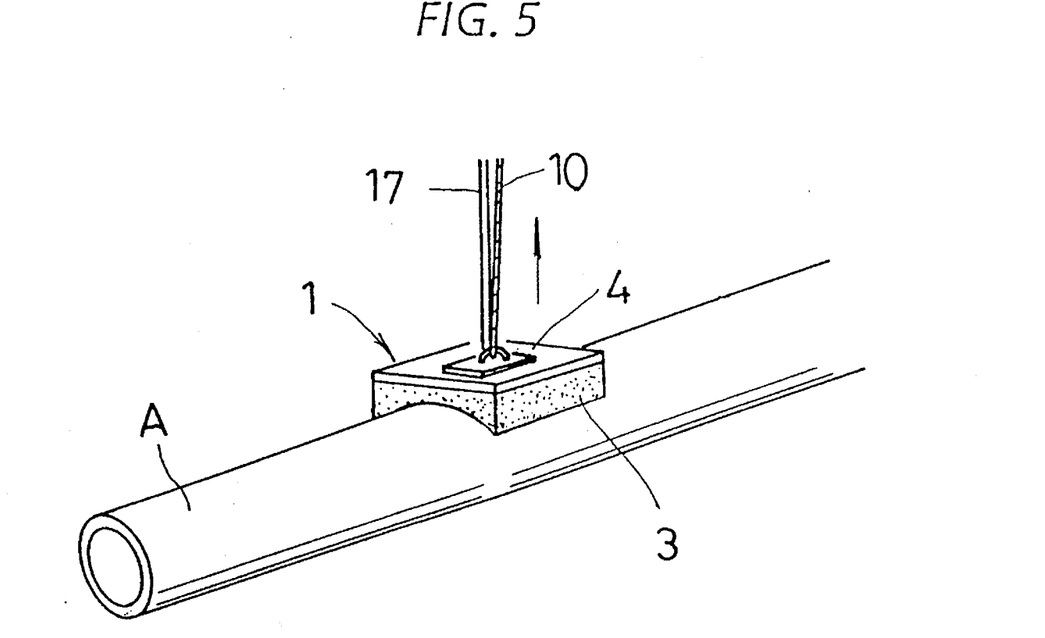
FIG. 5 is a perspective view of the vacuum adsorber which is adsorbing a tube.
Figure 6:
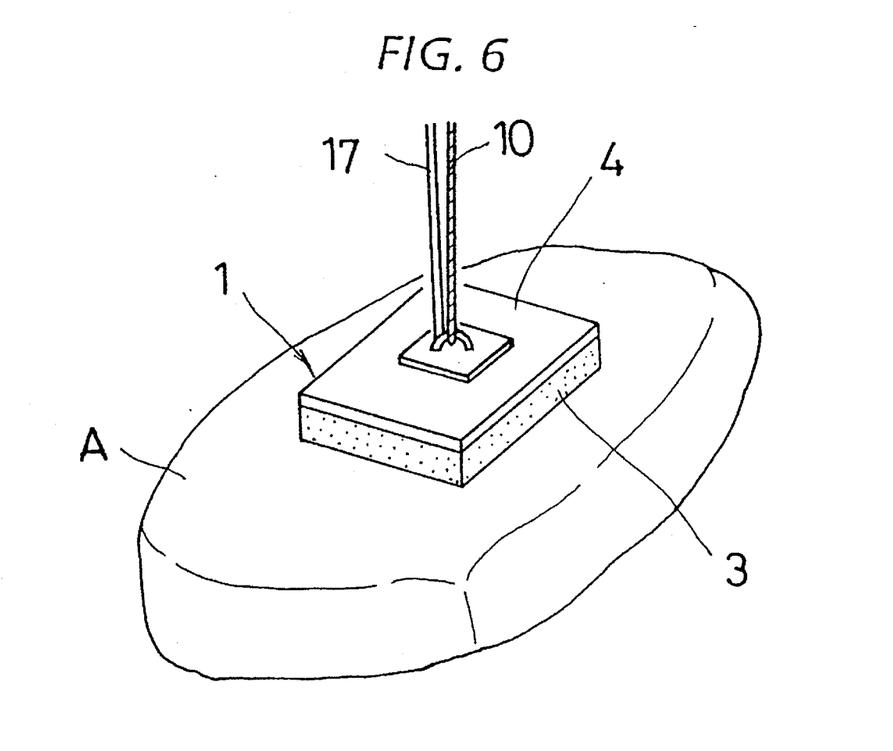
FIG. 6 is a perspective view of the vacuum adsorber which is adsorbing a bag.

The larger the vacuum, the larger the force with which the adsorption member 3 and the friction faces 7 are adsorbed to the object A, and thus the larger the weight of the object A that the vacuum adsorber is able to lift. Also, the friction force becomes larger so that slipping hardly takes place. The adsorption member 3 is able to contract and the sliders 5 are movable so that the vacuum adsorber 1 is adapted to adsorb an object A with uneven surfaces. For example, it is able to adsorb a cylindrical object such a pipe or electrical pole as shown in FIG. 5 and a solid bag as shown in FIG. 6. Also, it is able to adsorb a rock, tire, or a variety of construction materials, or used in a suspension type conveyer system.

Figure 7:
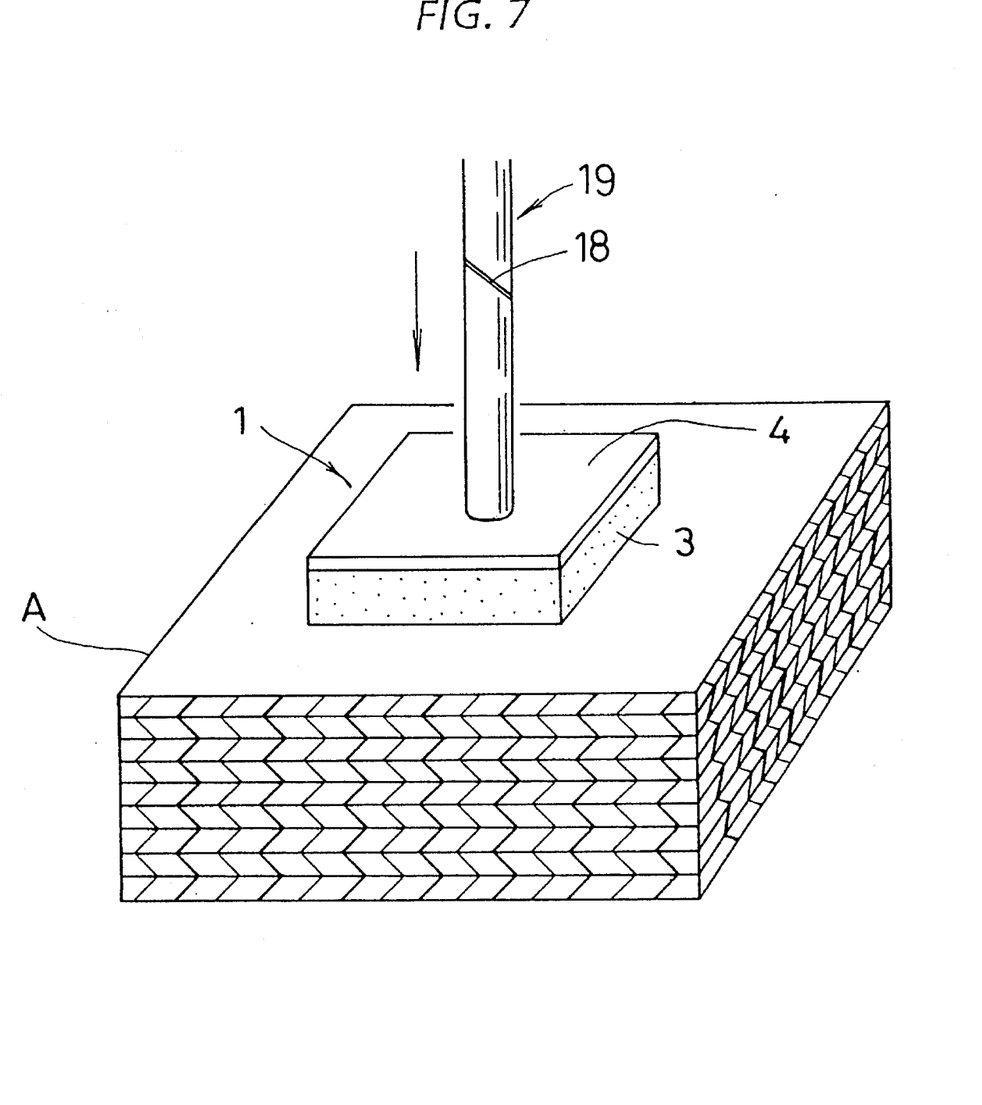
FIG. 7 is a perspective view of the vacuum adsorber which is adsorbing a plate.
Figure 8:
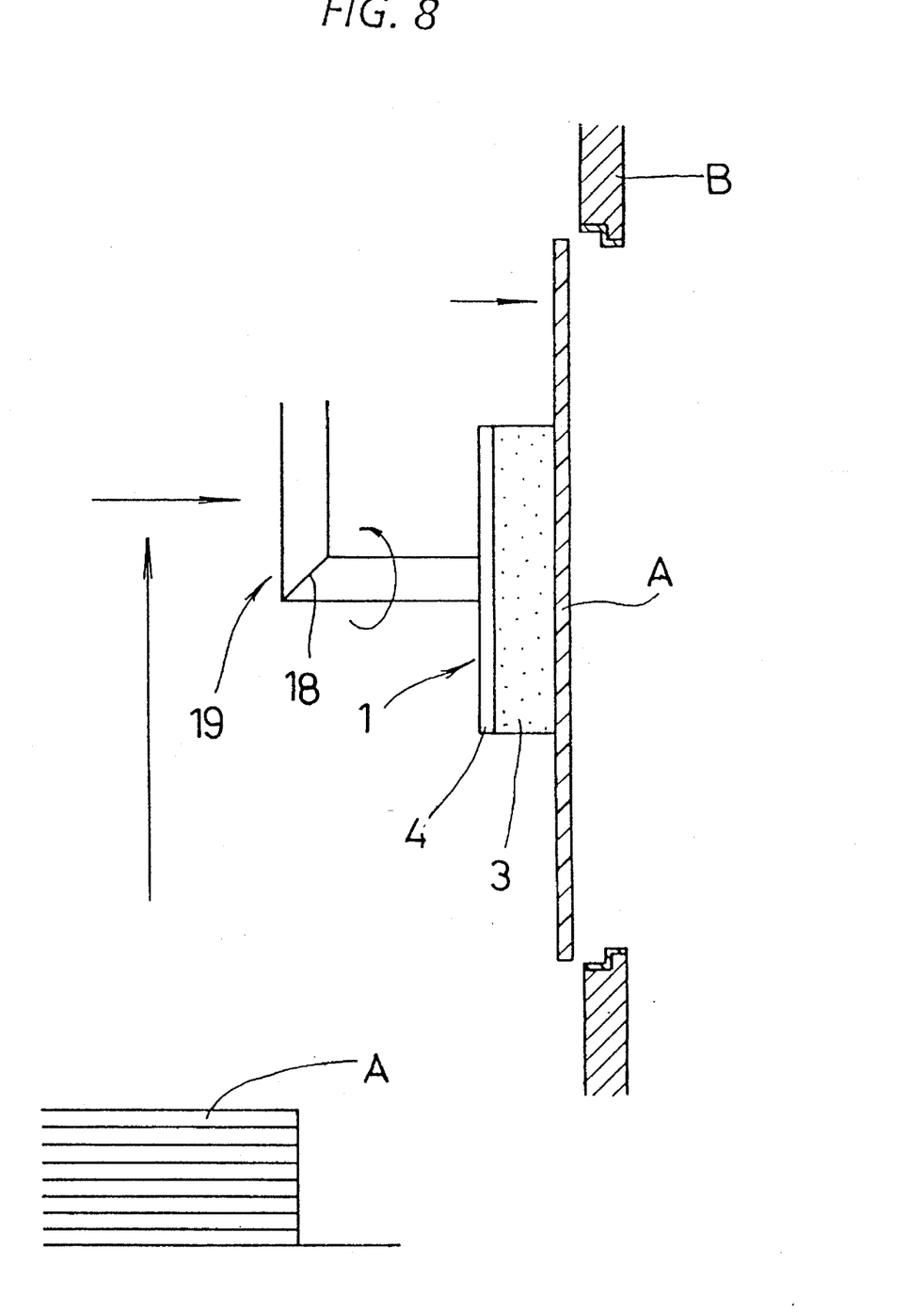
FIG. 8 is a side view of the vacuum adsorber which is carrying the plate toward a window.

Since the friction resistance between the friction face 7 and the object A is so high that slipping rarely takes place, it is possible to mount the vacuum adsorber 1 on the free end of a balancer 19 with a rotary face 18 as shown in FIG. 7. It is able to pick up glass plates one by one and attach to a window frame B as shown in FIG. 8. It is possible to do such work in the atmosphere of a gas, such as air or a liquid, such as water.

After the object A is lifted and/or carried to the destination, the vacuums are released so that the pressure of the cavities 2 increases to the pressure of atmosphere. Consequently, the adsorption between the vacuum adsorber 1 and the object A is released so that the object A falls by gravity. The adsorption member 3 elastically returns to the original height, and the sliders 5 are returned to the original positions by the spring members 15 and are ready for the next operation.

As described above, the side walls of the cavities in the adsorption member abut on the peripheries of the sliders so that the sucking of the elastic adsorption member into the cavities by the vacuum is prevented without any difficulty because the sliders are movable along with the contraction of the adsorption member.

The friction between the sliders and the object is so high that the vacuum adsorber is useful for objects with low friction surfaces even under wet conditions. In addition, it is useful in such work where gravity acts laterally on the object.

Moreover, the adsorption member deforms according to the contour of an object for close contact so that at least one of the friction faces abuts on the object. Thus, it is especially useful for objects with uneven surfaces.

Furthermore, if one or more vacuum cavities are not functional because of the damage or uneven surface of an object, the other vacuum cavities still are able to work independently thereby assuring the operational safety.

Moreover, since fluids are sucked evenly through the grooves on the friction faces, the adsorption force and friction resistance are even across the surface.

We claim:

1. A vacuum adsorber comprising:

a base;

an adsorption member attached to said base and made from an elastic material so as to have a vacuum cavity with an opening on a side opposite to said base;

a slider having a friction face and a periphery sliding along a side wall of said vacuum cavity;

a spring member provided within said vacuum cavity for biasing said slider toward said opening;

a vacuum tube for connecting said vacuum cavity to a vacuum source; and a through-hole provided on said friction face for allowing fluids to enter said vacuum cavity.

2. The vacuum adsorber of claim 1, wherein said friction face has a groove extending outwardly from said through-hole.

\* \* \* \* \*